(12) United States Patent
Fisher

(10) Patent No.: US 6,938,921 B2
(45) Date of Patent: Sep. 6, 2005

(54) VEHICLE SUBASSEMBLY

(75) Inventor: Sidney E. Fisher, Redditch (GB)

(73) Assignee: ArvinMeritor Light Vehicle Systems (UK) Ltd (GB)

( * ) Notice: Subject to any disclaimer, the term of this patent is extended or adjusted under 35 U.S.C. 154(b) by 24 days.

(21) Appl. No.: 10/300,462

(22) Filed: Nov. 20, 2002

(65) Prior Publication Data

US 2003/0094793 A1 May 22, 2003

(30) Foreign Application Priority Data

Nov. 21, 2001 (GB) .............................................. 0127870

(51) Int. Cl.⁷ .............................. B60R 21/22; B60J 5/04
(52) U.S. Cl. ...................... 280/730.2; 49/141; 292/92; 292/DIG. 23; 292/DIG. 65
(58) Field of Search .................. 280/730.2, 730.1, 280/735, 728.3; 180/281; 292/92, 93, 21, DIG. 23, DIG. 65; 49/141

(56) References Cited

U.S. PATENT DOCUMENTS

| | | | | |
|---|---|---|---|---|
| 1,627,728 A | * | 5/1927 | Conklin ...................... | 292/92 |
| 3,479,767 A | * | 11/1969 | Gardner et al. ............... | 49/141 |
| 5,327,990 A | * | 7/1994 | Busquets ..................... | 280/735 |
| 5,445,326 A | * | 8/1995 | Ferro et al. .......... | 292/DIG. 65 |
| 5,556,140 A | * | 9/1996 | Sakagami .................... | 292/92 |
| 5,799,516 A | * | 9/1998 | Zintle .................. | 292/DIG. 65 |
| 5,992,194 A | | 11/1999 | Baukholt et al. | |
| 6,485,081 B1 | * | 11/2002 | Bingle et al. ........ | 292/DIG. 65 |

FOREIGN PATENT DOCUMENTS

| | | | | |
|---|---|---|---|---|
| DE | 3835324 A1 | * | 5/1990 | ........... E05B/65/12 |
| EP | 1 074 681 A1 | | 2/2001 | |
| EP | 1 081 320 A1 | | 3/2001 | |
| FR | 2 783 547 A1 | | 3/2000 | |
| GB | 2175342 A | * | 11/1986 | ........... E05B/53/00 |
| GB | 2181699 A | * | 4/1987 | |
| WO | WO 98/58146 A1 | | 12/1998 | |
| WO | WO 00/49253 A1 | | 8/2000 | |

OTHER PUBLICATIONS

Great Britain Search Report, Application No. GB 0127870.4, Apr. 9, 2002.*
European Search Report dated Feb. 1, 2005; Application No. EP 02257506.

* cited by examiner

Primary Examiner—Peter C. English
(74) Attorney, Agent, or Firm—Carlson, Gaskey & Olds

(57) ABSTRACT

A vehicle subassembly includes a door latch and an emergency release mechanism for use in unlatching the door latch. The mechanism includes a release arranged so as to act on a latch input and to supply an increased unlatching force relative to that normally capable of being supplied to the door latch. An engagement member is actuable by a person to operate the release. In a first non-emergency condition the engagement member is substantially prevented from being actuated, and in a second emergency condition actuation the engagement member is allowed.

10 Claims, 3 Drawing Sheets

VEHICLE SUBASSEMBLY

This application claims priority to United Kingdom application number 0127870.4 filed on Nov. 21, 2001.

BACKGROUND OF THE INVENTION

The present invention relates to a vehicle subassembly. More particularly, the present invention relates to a vehicle subassembly comprising a release mechanism to unlatch a vehicle door latch in an emergency situation.

Energy is required to unlatch latched vehicle doors. This energy is primarily required to overcome the frictional resistance between a latch bolt and pawl tooth of a latch mechanism when the pawl tooth retains the latch in a latched position. This resistance is largely induced by the force of seals around the door that normally tend to urge the door into an ajar position, but which when the door is latched, act between a striker mounted on the door surround and the latch bolt. This force is commonly known as the "seal force" or "seal load". Under normal circumstances, the seal load is likely to be less than 1,000 N.

When a vehicle suffers an impact, particularly from the side, deformation of the vehicle door may result in an increased unlatching force being required. In light of increasing vehicle safety standards, it is desirable to provide means to permit unlatching at an increased seal load, preferably a seal load of up to 9,000 N, that is due to deformation of the vehicle.

SUMMARY OF THE INVENTION

Accordingly, one aspect of the present invention provides a vehicle subassembly comprising a door latch and an emergency release mechanism for use in unlatching the latch, the mechanism comprising release means arranged so as to act on a latch input and to supply an increased unlatching force relative to that normally capable of being supplied to the latch and engagement means actuable by a person to operate the release means, wherein a first non-emergency condition of an associated vehicle, the engagement means is substantially prevented from being actuated, and in a second emergency condition of the associated vehicle actuation of the engagement means is allowed.

A second aspect of the present invention provides a vehicle subassembly comprising a door latch, and an emergency release mechanism for use in unlatching the latch, the mechanism comprising release means arranged to act on a latch input and to supply an increased unlatching force relative to that normally capable of being supplied to the latch and engagement means actuable by a person to operate the release means, wherein actuation of the engagement means is only possible with an appropriate access authorisation device.

BRIEF DESCRIPTION OF THE DRAWINGS

Embodiments of the present invention will now be described, by way of example only, with reference to the accompanying drawings in which.

DESCRIPTION OF THE PREFERRED EMBODIMENT

Figure 1:
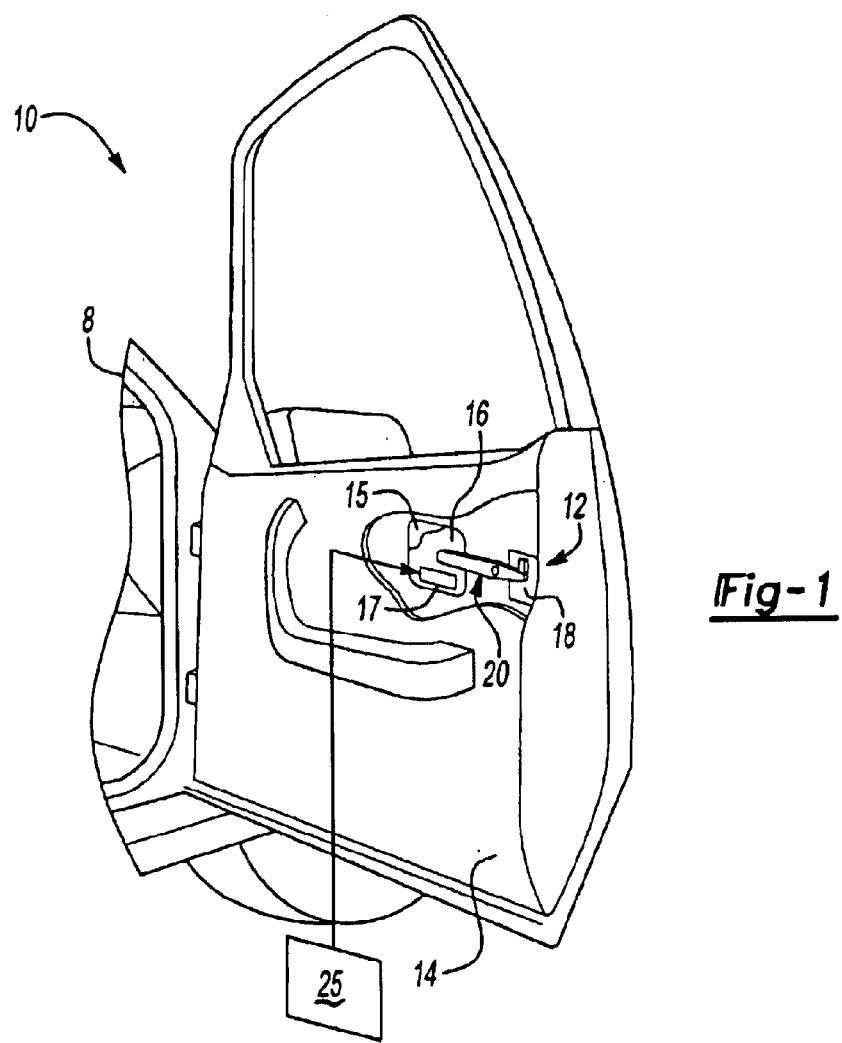
FIG. 1 is a schematic partially cut-away inside view of a vehicle door incorporating a subassembly according to the present invention.

Referring to FIG. 1, there is shown a door 10 hingeably mounted on a vehicle 8 having an inner trim panel 14 in which a recess 16 is provided, typically for the storage of a side airbag 17 (shown uninflated). The door 10 is further provided with a latch 18. In this embodiment the latch is connected to conventional manual inside and outside release handles (not shown) and a motor (not shown) to lock/unlock the latch in response to signals from a remote keyless entry device. In other embodiments, the latch may be a fully manual or fully electrically driven "power" latch. Indicated generally at 12 is a subassembly incorporating a release mechanism 20, recess 16, cover 15 (shown partially cut away) and the latch 18.

Under normal circumstances, the recess 16 is obscured by the cover 15. When a controller 25 (illustrated schematically in FIG. 1) for the airbag determines that an impact above a predetermined threshold has occurred in response to data it receives from one or more sensors (not shown), the controller signals deployment of the side airbag which is achieved using any suitable known means of inflation (typically involving the use of a squib containing a solid fuel and oxidiser that react to emit a predetermined volume of gas to cause inflation).

The pressure induced by inflation of the airbag causes the cover 15 to be displaced. This enables the airbag to inflate within the vehicle passenger compartment and thereby perform its cushioning function on vehicle occupants, as is well known. After the airbag has deployed, it deflates rapidly, thereby revealing recess 16.

Figure 2:
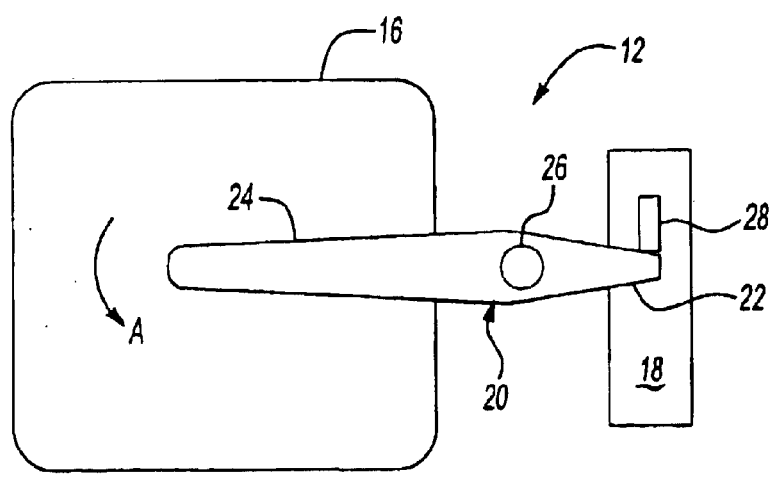
FIG. 2 is a schematic view of the subassembly of FIG. 1 in greater detail.

Turning now to FIG. 2 in which the subassembly is shown in greater detail and in a latched state, it can be seen that the release mechanism 20 of the subassembly 12 comprises engagement means in the form of a handle 24 and release means in the form of an arm 22 arranged to act on a pawl lifter 28 of the latch 18. The handle 24 and arm 22 are in the form of a single bar rotatably mounted to the door about a pivot 26.

It can be seen from FIG. 2 that rotating handle 24 in anti-clockwise direction A causes the release means to lift pawl lifter 28 thereby unlatching the latch and enabling the door 10 to be opened. The location of the pivot 26 closer to the arm 22 than the handle 24 results in the greater force being imparted on the pawl lifter 28 than is applied to the handle 24 by a vehicle occupant wishing to exit the vehicle after an impact. This means that a greater unlatching force can be imparted to the pawl lifter that a vehicle occupant could apply using a conventional manual latch release handle, or is supplied by a conventional unlatching motor in a power latch.

It is preferable that the release means acts directly on the pawl lifter 28 since this means that it is irrelevant whether the vehicle is locked, and emergency unlatching can be effected even if the latch is locked or super locked. This is particularly advantageous on vehicles fitted with power latches since power may cease to be supplied to the latch motors after an impact, and unlocking would otherwise be prevented.

Figure 3:
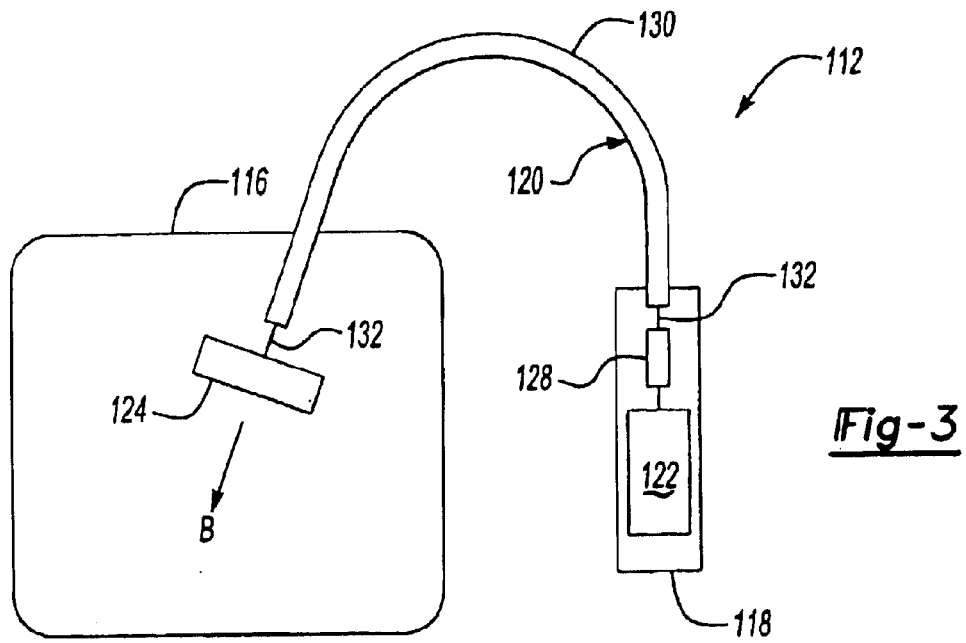
FIG. 3 is a schematic view of the subassembly according to a second embodiment of the present invention

Referring now to FIG. 3, a vehicle subassembly according to a second embodiment of the present invention is illustrated in a latched state. Like numerals have been used, where possible, for like parts with the addition of the prefix "1".

In this embodiment, the emergency release mechanism comprises a handle 124 located in recess 116. A Bowden cable having a fixed outer sheath 130 and a relatively slidable inner cable 132 is connected at one end to handle 124 and at its other end to release means. In this embodiment, the release means is in the form of a compressed gas canister and piston arrangement 122. It will be noted that some slack is provided in the cable to prevent the mechanism being triggered due to deformation of the door in an impact that may otherwise cause the cable to be placed under tension.

In order to release the latch, a vehicle occupant pulls on handle 124 in direction B, which in turn causes the inner cable 132 to cause compressed gas to be released from the canister using any suitable valve mechanism (not shown). In turn, this causes the piston arrangement to extend under the influence of the compressed gas and actuate pawl lifter 128, thus effecting unlatching. In other classes of embodiment, the gas canister and piston arrangement 122 may be dispensed with and addition force may be applied to the pawl lifter by extending the length of the pawl lifter in a direction out of the paper as shown in FIG. 3 and connecting the inner cable 132 to the free end of the lifter.

Figure 4:
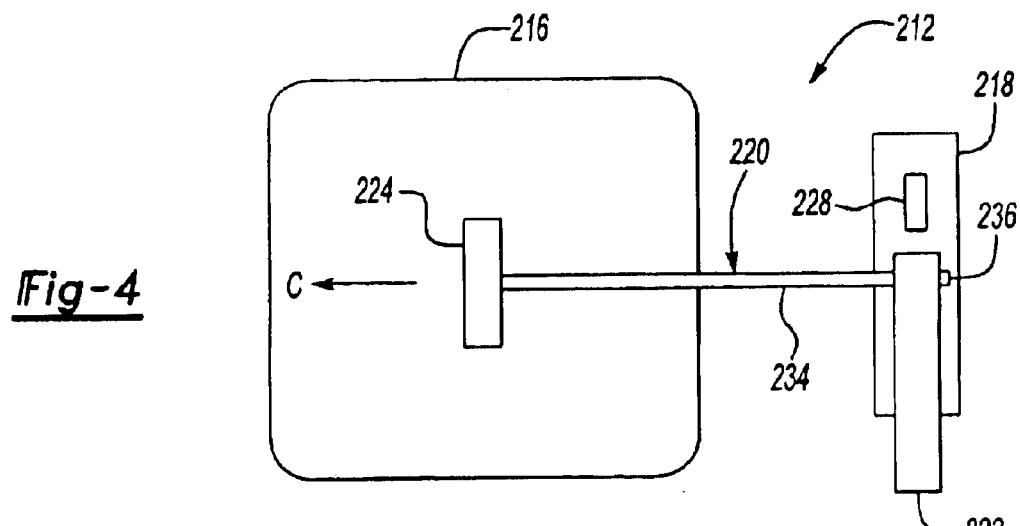
FIG. 4 is a schematic view of the subassembly according to a third embodiment of the present invention.

A third embodiment of the vehicle subassembly according to the present invention is illustrated in FIG. 4. Again, like numerals are used where possible for like parts, with the addition of the prefix "2".

In this embodiment, the engagement means comprises a handle 224 located in recess 216. The handle is secured to an axially slidable and vertically restrained rod 234. In the non-deployed state showing in FIG. 4, the end 236 of the rod 234 remote from handle 224 retains a release means in the form of a compression spring 222 in a pre-loaded condition. To release the compression spring 222, a vehicle occupant pulls handle 224 in direction C, thereby enabling the spring 222 to extend to its rest position and lift the pawl lifter 228.

Figure 5:
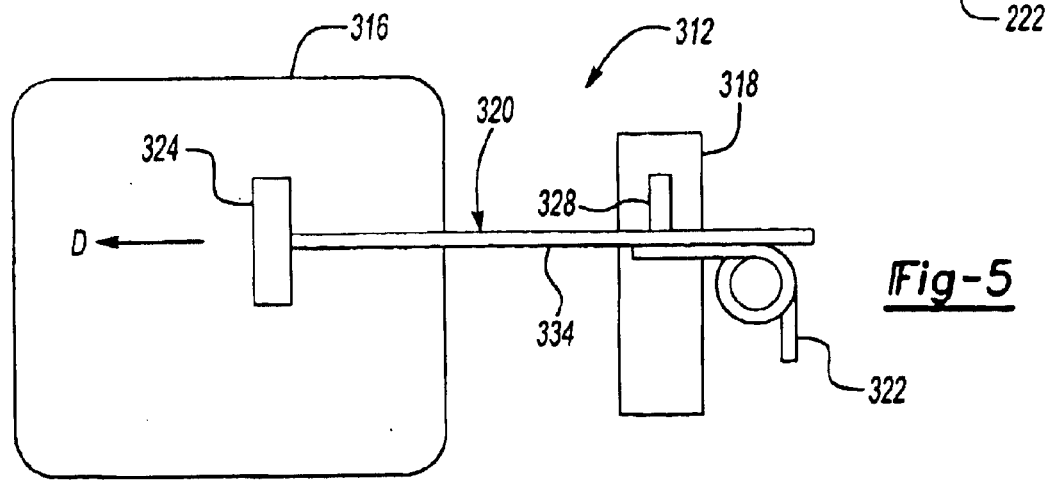
FIG. 5 is a schematic view of a subassembly according to a fourth embodiment of the present invention.

A fourth embodiment of a vehicle subassembly according to the present invention is shown in FIG. 5 in which like parts have where possible been designated by like numerals with the addition of the prefix "3".

The release mechanism 320 of this embodiment is similar to that of the third embodiment of FIG. 4 except that the compression spring is replaced by a pre-loaded helical torsion spring 322. Again, pulling handle 324 in direction D releases the torsion spring to act on pawl lifter 328 and release the latch 318. In this embodiment, rod 334 has been extended so as to substantially reduce the risk that door deformation will cause accidental release of the release mechanism 320. In other classes of embodiment, a Bowden cable in which slack is provided may interconnect the handle 324 and a section of rod adjacent pawl lifter 328 to reduce the risk of accidental release caused by door deformation.

By placing the engagement means of the release mechanism in an airbag recess, unauthorised personnel, such as potential thieves are substantially prevented from overriding the locked state of a vehicle by breaking a vehicle window and pulling the release means to gain access to the vehicle. It will nevertheless be appreciated that engagement means may be placed in other locations, such as in an airbag recess providing on the steering wheel of a vehicle or in a recess provided for a passenger airbag within the vehicle fascia in front of the passenger. A suitable linkage may be provided to the release means, such as a Bowden cable. Alternatively, a covered recess may be provided in the vehicle door trim or elsewhere in the vehicle specifically for the engagement means, the cover being displaced in response to the sensing of an impact by a controller associated with the cover.

Figure 6:
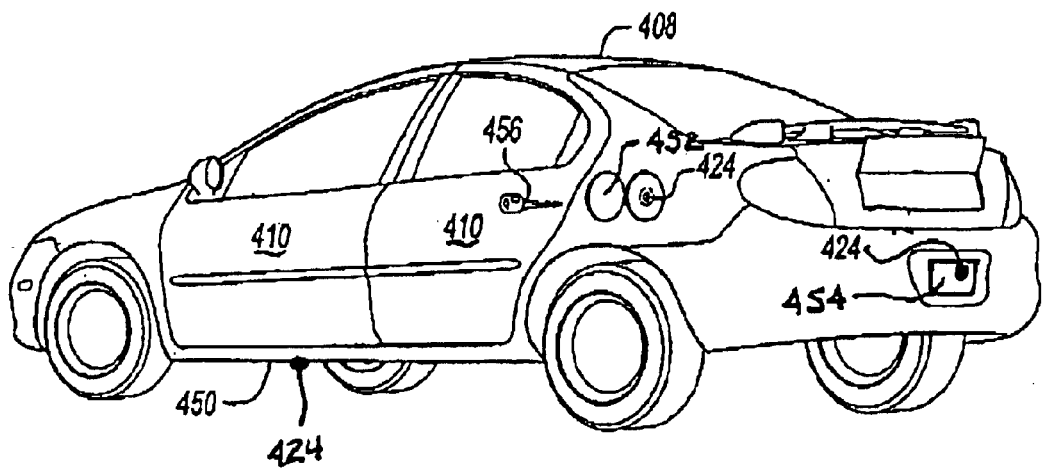
FIG. 6 is a perspective view of a vehicle illustrating a subassembly according to a fifth embodiment of the present invention.

Referring to FIG. 6, as an alternative to, or in addition to the release mechanism as described above, engagement means may be provided on the exterior of a vehicle 408 to enable emergency personnel to release the doors 410 of the vehicle from the vehicle exterior, even if the vehicle occupant(s) are unable to do so themselves due to injuries they may have sustained, for example. To prevent such external engagement means from being actuated by unauthorised personnel, it is preferable that firstly the engagement means 424 be placed in an obscured position on the vehicle 408, such as on the underside of a door sill 450, behind the fuel filler cover 452, or behind a vehicle number plate 454, and secondly that the engagement means 424 may only be actuated with the use of a key 456, coded access means, or a similar access authorisation device to be carried by emergency personnel.

Figure 7:
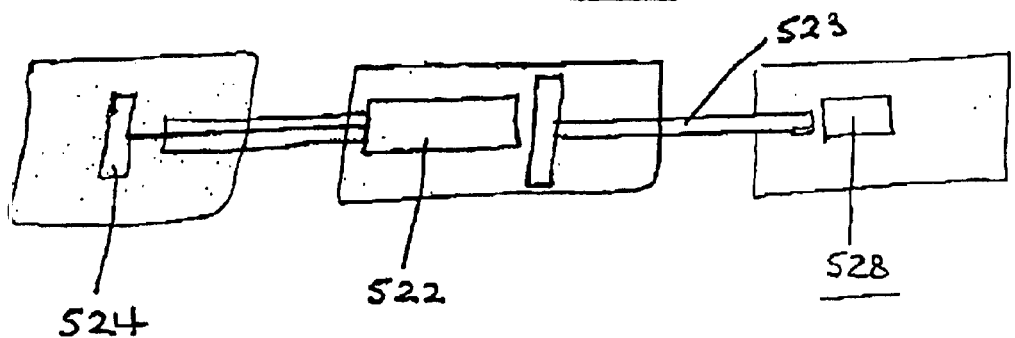
FIG. 7 is a block diagram of a subassembly according to a sixth embodiment of the present invention.

Referring to FIG. 7, it will be understood that numerous other suitable release means may be employed such as solid fuel squibs 522 as described above in relation to airbag inflators, but from which the gas produced is used to cause a piston or ram 523 to extend and actuate the pawl lifter 528 in response to a handle 524 being pulled. Other means of mechanically increasing the force to the pawl lifter may be employed, such as the use of gears, for example.

What is claimed is:

1. A vehicle subassembly comprising a door latch and an emergency release mechanism for use in unlatching the door latch, the emergency release mechanism comprising a release means arranged so as to act on a latch input and to supply an unlatching force to the door latch and an engagement means actuatable by a person to operate the release means, the subassembly further comprising a cover and an actuator, wherein in a first non-emergency condition of an associated vehicle, the engagement means is substantially prevented from being actuated by the person due to the position of the cover, and in a second emergency condition of the associated vehicle the cover is displaced by the actuator to allow actuation of the engagement means by the person.

2. The subassembly according to claim 1 wherein the release means is arranged so as to act directly on a pawl lifter of the door latch.

3. The subassembly according to claim 1 wherein the release means comprises a device in which energy is stored while in the first non-emergency condition for the selective release thereof to cause unlatching of the door latch in the second emergency condition.

4. The subassembly according to claim 3 wherein the release means comprises a resilient member.

5. The subassembly according to claim 1 wherein the release means is configured to provide a mechanical advantage to a force provided by the person to the engagement means so as to effect unlatching.

6. A vehicle subassembly comprising a door latch and an emergency release mechanism for use in unlatching the door latch, the emergency release mechanism comprising a release means arranged so as to act on a latch input and to supply an unlatching force to the door latch and an engagement means actuatable by a person to operate the release means, the subassembly further comprising a cover and an actuator, wherein in a first non-emergency condition of an associated vehicle the engagement means is substantially prevented from being actuated by the person due to a position of the cover, and in a second emergency condition of the associated vehicle, the cover being displaced by the actuator to permit actuation of the engagement means by the person, wherein the actuator is an airbag and the cover is also a cover for obscuring the airbag provided on the associated vehicle in the first non-emergency condition.

7. A vehicle subassembly comprising a door latch and an emergency release mechanism for use in unlatching the door latch, the emergency release mechanism comprising a release means arranged so as to act on a latch input and to supply an unlatching force to the door latch and an engagement means actuatable by a person to operate the release means, the subassembly further comprising a cover and an actuator, wherein in a first non-emergency condition of an associated vehicle the engagement means is substantially prevented from being actuated by the person due to a position of the cover, and in a second emergency condition of the associated vehicle, the cover being displaced by the actuator to permit actuation of the engagement means by the person, wherein a controller is provided so as to signal the actuator to displace the cover when a vehicle impact is detected.

8. A door assembly including a door latch and an emergency release mechanism for use in unlatching the door latch, the emergency release mechanism comprising a release means arranged so as to act on a latch input and to supply an unlatching force to the door latch and an engagement means actuatable by a person to operate the release means, the assembly further comprising a cover and an actuator, wherein in a first non-emergency condition of an associated vehicle, the engagement means is substantially prevented from being actuated by the person due to the position of the cover, and in a second emergency condition of the associated vehicle the cover is displaced by the actuator to allow actuation of the engagement means by the person.

9. A vehicle incorporating a subassembly including a door latch and an emergency release mechanism for use in unlatching the door latch, the emergency release mechanism comprising a release means arranged so as to act on a latch input and to supply an unlatching force to the door latch and an engagement means actuatable by a person to operate the release means, the subassembly further comprising a cover, and an actuator, wherein in a first non-emergency condition of the vehicle, the engagement means is substantially prevented from being actuated by the person due to the position of the cover, and in a second emergency condition of the vehicle, the cover being displaced by the actuator to allow actuation of the engagement means by the person.

10. An emergency release assembly comprising:
a release for unlatching a door latch; and
an engagement device actuatable for operating said release, access to said engagement device provided responsive to actuation of a vehicle emergency system, wherein a cover prevents access to said engagement device and actuation of the vehicle emergency system displaces the cover providing access to said engagement device.

* * * * *